US012590760B2

(12) United States Patent
Thomas et al.

(10) Patent No.: US 12,590,760 B2
(45) Date of Patent: Mar. 31, 2026

(54) SPIN RINSE DRYER WITH IMPROVED DRYING CHARACTERISTICS

(71) Applicant: SPTS Technologies Limited, Newport (GB)

(72) Inventors: Trevor Thomas, Newport (GB); Martin Ayres, Newport (GB)

(73) Assignee: SPTS Technologies Limited, Newport (GB)

( * ) Notice: Subject to any disclaimer, the term of this patent is extended or adjusted under 35 U.S.C. 154(b) by 822 days.

(21) Appl. No.: 17/510,333

(22) Filed: Oct. 25, 2021

(65) Prior Publication Data

US 2022/0155011 A1 May 19, 2022

(30) Foreign Application Priority Data

Nov. 17, 2020 (GB) ...................................... 2018030

(51) Int. Cl.
*F26B 5/08* (2006.01)
*F26B 11/18* (2006.01)
*F26B 25/10* (2006.01)

(52) U.S. Cl.
CPC ................ *F26B 5/08* (2013.01); *F26B 11/18* (2013.01); *F26B 25/10* (2013.01)

(58) Field of Classification Search
CPC ............. F26B 5/08; F26B 11/18; F26B 25/10
See application file for complete search history.

(56) References Cited

U.S. PATENT DOCUMENTS

| | | | | |
|---|---|---|---|---|
| 5,232,511 | A * | 8/1993 | Bergman | H01L 21/67075 134/2 |
| 5,954,072 | A | 9/1999 | Matusita | |
| 6,497,241 | B1 * | 12/2002 | Pascal | H01L 21/67028 134/148 |
| 8,172,646 | B2 | 5/2012 | Feng et al. | |

(Continued)

FOREIGN PATENT DOCUMENTS

| | | |
|---|---|---|
| JP | 2013211377 A | 10/2013 |
| JP | 2017117954 A | 6/2017 |
| TW | 201802864 A | 1/2018 |

OTHER PUBLICATIONS

IPO, Search Report for UK App. No. 2018030.3, Apr. 15, 2021.

(Continued)

*Primary Examiner* — David J Laux
(74) *Attorney, Agent, or Firm* — Hodgson Russ LLP

(57) ABSTRACT

A spin rinse dryer for treating a substrate has an enclosure, a rotatable support for supporting the substrate, a rotatable member located within the enclosure above the rotatable support, and a drive for rotating the rotatable member. During cleaning of the wafer, liquid that splashes up from the wafer will strike the rotatable member, rather than the upper wall of the enclosure, and may form droplets on the rotatable member. After the flow of cleaning liquid has stopped, the drive can rotate the rotatable member at high speed, which tends to throw the liquid droplets off the rotatable member through centrifugal force. The liquid then runs down the walls of the enclosure, away from the wafer, so that there is a much reduced chance of contamination of the cleaned wafer. The rotatable member and support may be integrally formed and rotated together or may be separate members.

20 Claims, 3 Drawing Sheets

(56) References Cited

U.S. PATENT DOCUMENTS

| | | | | |
|---|---|---|---|---|
| 9,421,617 | B2 * | 8/2016 | Goodman | B23B 31/1261 |
| 9,455,139 | B2 | 9/2016 | Buckalew et al. | |
| 2001/0025428 | A1 * | 10/2001 | Cho | H01L 21/67034 34/58 |
| 2003/0131494 | A1 * | 7/2003 | Lubomirsky | H01L 21/67028 34/317 |
| 2004/0050491 | A1 * | 3/2004 | Miya | H01L 21/67051 156/345.11 |
| 2007/0240824 | A1 | 10/2007 | Kaneko et al. | |
| 2012/0260518 | A1 * | 10/2012 | Melgaard | F26B 3/30 34/526 |
| 2013/0125931 | A1 * | 5/2013 | Nagamine | B08B 3/12 134/95.2 |
| 2015/0090694 | A1 * | 4/2015 | Hashimoto | H01L 21/6704 134/33 |
| 2015/0099433 | A1 | 4/2015 | Tanaka | |
| 2017/0186599 | A1 * | 6/2017 | Takahashi | H01L 21/67051 |
| 2018/0211856 | A1 | 7/2018 | MacNeil et al. | |
| 2020/0309452 | A1 * | 10/2020 | Lee | H01L 21/67034 |

OTHER PUBLICATIONS

JPO, Office Action issued for Japanese Patent Application No. 2021-173208, Feb. 25, 2025.

TIPO, Office Action issued for ROC (Taiwan) Patent Application No. 110139522, Nov. 5, 2024.

* cited by examiner

SPIN RINSE DRYER WITH IMPROVED DRYING CHARACTERISTICS

CROSS-REFERENCE TO RELATED APPLICATIONS

This application claims priority to UK Patent Application No. 2018030.3 filed Nov. 17, 2020, the disclosure of which is hereby incorporated by reference.

FIELD OF THE DISCLOSURE

The invention is concerned with a spin rinse dryer, and more particularly to a spin rinse dryer provided with means to reduce the chance of unwanted contamination.

BACKGROUND OF THE DISCLOSURE

Spin rinse dryers (SRDs) are commonly used in the semiconductor industry and related industries to clean substrates. They can be used as stand-alone units or can be integrated into a larger system which includes additional systems for carrying out other functions (for example, wet etch systems, photoresist systems, or electrochemical deposition systems).

A common function of SRDs is the cleaning and drying of (typically circular) workpieces or (particularly in the semiconductor industry) wafer substrates. During a cleaning step, a cleaning fluid (typically an aqueous solution) is sprayed at the wafer while the wafer is rotated at a relatively low speed (typically 50 to 200 rpm) in a horizontal plane. Usually, this takes place within a chamber or enclosure, which prevents escape of liquid spray and ensures that the wafer is retained in a controlled environment. The process volume is typically purged with an inert gas (such as $N_2$) from above the wafer to aid fluid flow within the chamber. Once the cleaning fluid has removed the contaminants from the wafer, the fluid flow is stopped, and the wafer is spun at high speed (up to around 2000 to 2500 rpm) to facilitate wafer drying before coming to rest ready for retrieval and movement onward to further process steps.

In some critical process steps, such as a final clean prior to the return to a cassette or front opening unified pod (FOUP), it is essential that this “wash and dry” process has not only cleaned the wafer adequately, but also that the wafer is completely dry on retrieval from the SRD chamber. The presence of aqueous droplets on the wafer surface can lead to damage of the devices on the substrate; for example, if the layer being cleaned is a metal such as copper, an aqueous droplet could cause corrosion or excessive oxidation of the surface of the substrate. This is undesirable as it could result in yield loss.

There are a number of benefits, such as cost, productivity and yield, of integrating a number of process steps into a single automated system. In the case of an electrochemical deposition system, a process sequence could involve a pre-clean step, followed by a number of metal deposition steps, and several post-deposition wafer clean steps before returning to the wafer cassette or FOUP.

When relatively thick (several microns) metal deposition steps are required for (for example) bump metallization, a relatively large number of modules (more than ten deposition stations) are required for production systems to be cost effective. Minimizing footprint in the context of semiconductor capital equipment is important, as clean room space is expensive and thus the footprint of a tool is a key contributor to the overall tool cost of ownership. This has led to the approach of “stacking” process modules vertically to improve productivity while minimizing clean room footprint. For example, U.S. Pat. No. 9,421,617 shows (in FIG. 2 of that document) an arrangement in which one SRD module is arranged above a second SRD module.

FIGS. 1*a* and 1*b* show schematic representations of a conventional bowl type SRD, similar to the type shown in U.S. Pat. No. 6,497,241. In FIG. 1*a*, the top of the chamber 1 is open, so that the wafer 3 can be inserted into and removed from the chamber 1 from above. In FIG. 1*b*, the chamber 1 has a flat lid 7 to provide an enclosure. The wafer 3 may be inserted into and removed from the chamber 1 via a slit in the side wall; alternatively, the lid 7 may be removed, so that the wafer 3 can be inserted and removed in a similar manner to the arrangement shown in FIG. 1*a*.

Chamber 1 is typically made from a polymeric material such as high-density polyethylene (HDPE), polytetrafluoroethylene (PTFE), perfluoroalkoxy alkanes (PFA), polyvinyl chloride (PVC) or the like. The choice of material will largely depend on the nature of the cleaning fluid being used to process the wafer. Some cleaning fluids are not compatible with conventional polymer materials, and if these fluids are used, stainless steel or another metal could be used to fabricate the chamber.

The chamber has a rotor assembly 2 which retains the wafer 3 and can be controlled to rotate at speeds up to around 3000 rpm. A spray nozzle or a series of spray nozzles 4*a* are located above the plane of the wafer 3 and are directed at the front surface of the wafer. Similarly, a spray nozzle or a series of spray nozzles 4*b* are located below the plane of the wafer 3 and are directed at the back surface of the wafer.

Fluid from the nozzles 4*a*, 4*b* strikes the wafer 3, is flung away from the wafer 3 to impact the side walls of the chamber 1 as in a centrifuge, and is removed from an exhaust port (not shown) at the base of the chamber 1. After the washing step, an inert purge gas (such as $N_2$) can be directed at the wafer 3 to help in drying it. However, ever after the wafer 3 has been dried, some fluid may be retained on the walls of the chamber 1, and in the arrangement of FIG. 1*b*, it is possible for droplets 6 to form on the lower surface on the chamber lid 7. These droplets could fall on the wafer 3 during the removal of the wafer 3 from the chamber 1, and contaminate the wafer 3.

Clearly, this problem does not arise in the arrangement of FIG. 1*a*, as there is no lid on which droplets could form. However, the arrangement of FIG. 1*a* is not compatible with a low profile SRD module design; if a number of SRDs as shown in FIG. 1*a* were to be vertically stacked, there would need to be a large gap between modules to avoid droplets forming on the lower surface of the upper module.

Alternative approaches have been proposed to deal with the problem of droplet formation on the lower surface of the lid. For example, U.S. Pat. No. 9,421,617 (mentioned above) shows an arrangement where the lid 10 is formed in a conical shape (shown schematically in FIG. 2*a*), so that the droplets will tend to run downwards and radially outwards, away from the wafer. This effect can be increased by forming the lower surface of the lid as a hydrophobic surface. FIG. 2*b* shows an arrangement where the lid 12 is formed as a dome, which again may have a hydrophobic lower surface. A nozzle for purge gas can be provided at the top of the dome 12 to direct inert purge gas (such as $N_2$) along the inner surface of the dome 12 to push the droplets radially outwards and away from the wafer.

However, both of these arrangements require considerable vertical space above the wafer, and so they are not well suited to high density vertical chamber stacking.

BRIEF SUMMARY OF THE DISCLOSURE

Accordingly, it is an object of the invention to provide a low-profile spin rinse dryer capable of high density vertical stacking, with a reduced risk of contamination of the wafer after cleaning and drying.

According to a first aspect of the invention, there is provided a spin rinse dryer for treating a substrate, including: an enclosure; a rotatable support for supporting the substrate; a rotatable member located within the enclosure above the rotatable support, the rotatable member having a continuous lower surface; and a drive for rotating the rotatable member.

During cleaning of the wafer, any liquid that splashes up from the wafer will strike the lower surface of the rotatable member, rather than the upper wall of the enclosure, and may form droplets on the rotatable member. After the flow of cleaning liquid has stopped, the drive can rotate the rotatable member at high speed, which tends to throw the liquid droplets off the lower surface of the rotatable member through centrifugal force. The liquid then runs down the walls of the enclosure, away from the wafer, so that there is a much reduced chance of contamination of the cleaned wafer.

It is an advantage of the invention that the spin rinse dryer can be provided as a low profile spin rinse dryer. A low profile spin rinse dryer of the invention can be of vertical height 300 mm or less. This is particularly suitable for applications in which modules are vertically stacked.

The lower surface of the rotatable member may be arranged to be substantially parallel to an upper surface of a substrate when that substrate is supported by the rotatable support.

The rotatable support may be connected to the rotatable member such that the rotatable support and the rotatable member rotate together. A number of arms may extend downwards from the rotatable member, and a prong may extend radially inwardly from the lower end of each arm, the prongs acting as the rotatable support. There may be three circumferentially equispaced arms.

The drive may be located alongside the enclosure, and may be connected to the rotatable member and the rotatable support so as to drive them to rotate.

The rotatable support and the rotatable member may be unconnected to each other, and may rotate separately. The rotatable support and the rotatable member may be arranged to rotate about a common axis. A single drive may be located alongside the enclosure, and may be connected to both the rotatable member and the rotatable support so as to drive them to rotate. The drive may be connected to the rotatable member and the rotatable support via a telescopic shaft. In another arrangement, two drives may be located alongside the enclosure; a first of the drives may be connected to the rotatable member so as to drive it to rotate, and a second of the drives may be connected to the rotatable support so as to drive it to rotate.

The enclosure and the rotatable member may both be circular in plan view. The diameter of the rotatable member may be slightly less than the internal diameter of the enclosure. The diameter of the rotatable member may be greater than the diameter of the substrate to be treated.

The rotatable member may be formed from a hydrophobic material, such as polycarbonate.

The rotatable member may be formed as a single part.

The rotatable member may be formed with reinforcing features such as ribs.

The spin rinse dryer may be provided with nozzles located above and below the rotatable support for directing liquid toward a substrate located on the rotatable support.

The spin rinse dryer may be capable of operating at pressures below atmospheric pressure.

The spin rinse dryer may have a vertical height of less than around 300 mm.

The invention also extends to an apparatus for processing a substrate comprising a stack of substrate processing modules in which at least one of the modules is a spin rinse dryer as described above.

According to a further aspect of the invention, there is provided a method of treating a substrate, comprising: supporting a substrate on a rotatable support in an enclosure below a rotatable member; directing liquid at the substrate from nozzles above and below the rotatable support to wash the substrate; rotating the rotatable support to remove liquid from the substrate; rotating the rotatable member to remove liquid from the rotatable member; and removing the substrate from the enclosure.

The substrate may be a semiconductor substrate, such as a semiconductor wafer.

Whilst the invention has been described above, it extends to any combination of the features set out above, or in the following description, drawings or claims. For example, any features disclosed in relation to one aspect of the invention may be combined with any features disclosed in relation to any other aspect of the invention.

DESCRIPTION OF THE DRAWINGS

Preferred embodiments of the invention will now be described by way of example only and with reference to the accompanying drawings, in which.

DETAILED DESCRIPTION OF THE DISCLOSURE

Figure 3:
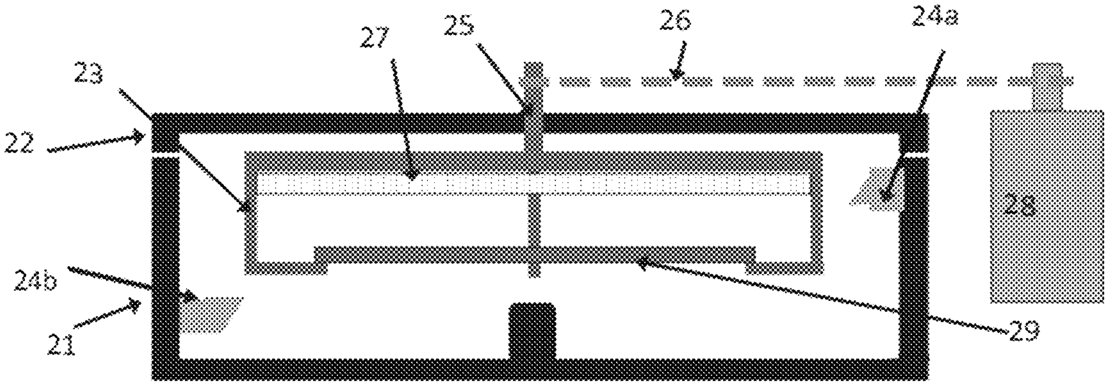
FIG. 3 is a schematic cross-sectional view of a first embodiment of a spin rinse dryer according to the invention.

FIG. 3 shows a first embodiment of the invention. The spin rinse dryer of FIG. 3 includes an enclosure formed by a main body 21 and a lid 22, with a rotatable support 23 for the wafer 29. Located above the wafer 29 and below the lid 22 of the enclosure is a rotatable member 27, in the form of a disc with a continuous lower surface. Any liquid that splashes up from the wafer 29 during cleaning will strike the lower surface of the rotatable member 27, rather than the lid 22 of the enclosure, so droplets will form on the rotatable member 27 instead of the lid 22. The rotatable member 27 can then be rotated to remove the droplets from the lower surface via centrifugal force.

In the specific version shown in FIG. 3, the rotatable support 23 for the wafer 29 and the rotatable member 27 are formed integrally. Three circumferentially equispaced arms extend downwards from the rotatable member 27, and the wafer 29 is supported on three prongs which extend radially inwardly from the lower ends of the arms. The rotatable member 27, and thus the arms and prongs, are rotated by a central shaft 25 which extends vertically through the lid 22 of the enclosure. The central shaft 25 is powered to rotate by means of a motor 28 located to one side of the chamber, with the shaft of the motor 28 extending vertically and being connected to the central shaft 25 by a belt drive 26. Arranging the drive means alongside the enclosure reduces the overall height of the spin rinse dryer.

Figure 1A:
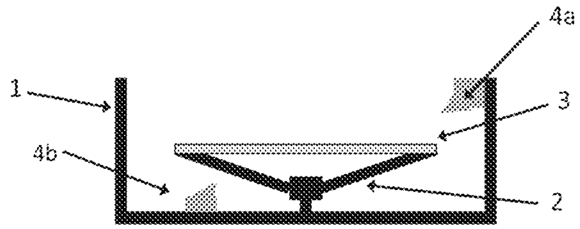
Fig 1a (Prior Art)
FIGS. 1*a* and 1*b* are schematic views of prior art spin rinse dryers.
Figure 1B:
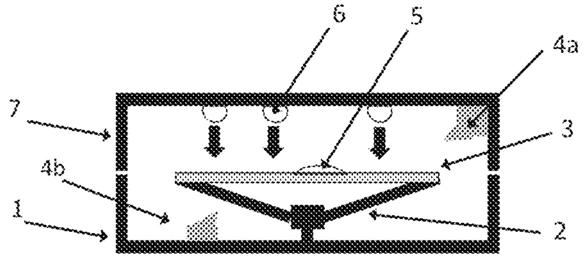
Fig 1b (Prior Art)
Figure 2A:
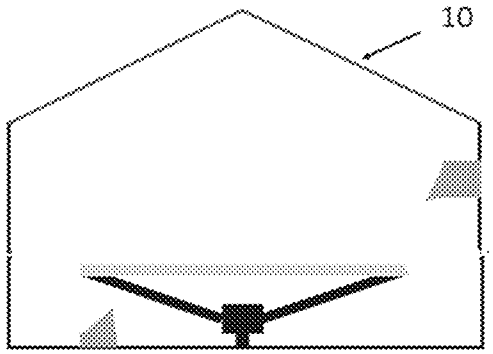
Fig 2a (Prior Art)
FIGS. 2*a* and 2*b* are schematic views of prior art spin rinse dryers which includes means aimed at reducing contamination of a cleaned wafer.
Figure 2B:
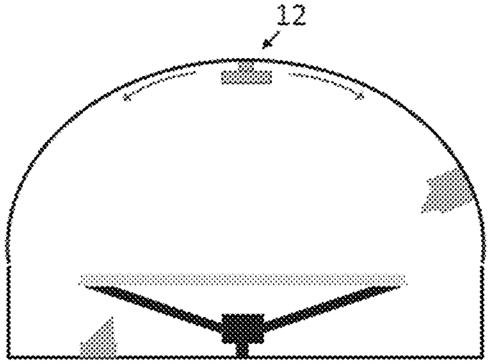
Fig 2b (Prior Art)

During wafer cleaning, the rotatable member 27 and the rotatable support 23 for the wafer 29 are rotated (typically at 50 to 200 rpm) while cleaning fluid is sprayed from nozzles 24*a* and 24*b*. All of the internal surfaces of the chamber will be wetted with scattered spray, and this has the potential to form hanging liquid droplets (similar to those shown in FIG. 1*b*), which could fall on to the wafer 29.

Once the wafer 29 has been washed, the fluid supply is turned off and the wafer 29 is dried by rotation at high speed (typically 2000 to 2500 rpm). An inert drying purge gas such as nitrogen can also be used. During this high speed rotation, not only is the wafer 29 dried (by centrifugal forces moving water radially away from the wafer 29), but so is the rotatable member 27 which is located directly above the wafer 29. The droplets formed on the rotatable member 27 will be thrown off by centrifugal force. When the rotation ends, there should be no drops of liquid above the wafer 29, and so there should be no risk of liquid dripping onto the wafer 29. Furthermore, this is achieved in a low profile package (that is, with minimal vertical height).

Typically, the rotatable member 27 has a larger diameter than the wafer 29; for example, if the wafer 29 has a diameter of 300 mm, the rotatable member 27 would have a diameter of 320 mm. Further, the rotatable member 27 should extend as close as possible to the chamber walls, and preferably to within at most 10 mm of the chamber walls. This further reduces the risk of liquid dripping from the lower surface of the lid 22 of the chamber onto the wafer 29. Drainage channels for fluid can be located near the chamber walls. In addition, the top of the rotatable member 27 should be positioned close to the lower surface of the lid 22 of the chamber (to reduce the risk of spray from the nozzles hitting the lower surface of the lid 22 of the chamber), and is preferably positioned within 3 mm of the lower surface of the lid 22 of the chamber.

Figure 4:
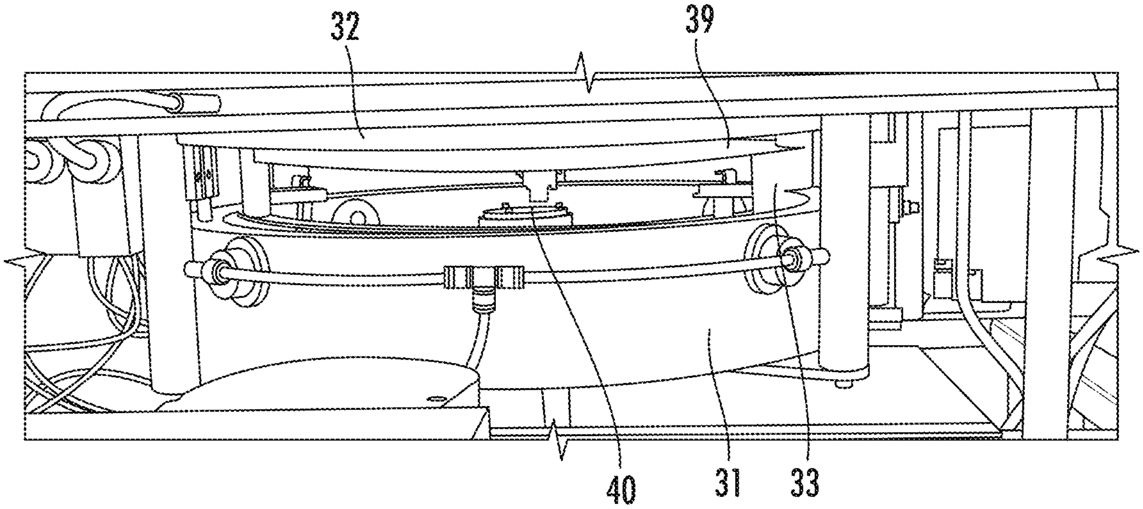
FIG. 4 is a side view of a spin rinse dryer according to the invention.

FIG. 4 shows a low profile spin rinse dryer with the chamber open to allowing loading or unloading of a wafer. In this case, the lower part 31 of the chamber moves away from the upper part 32, which is fixed, but it would also be possible for the lower part 31 of the chamber to be fixed and for the upper part of the chamber to be moved 32. This opening and closing movement can be achieved using electric motors or pneumatic or hydraulic pistons.

When the chamber is open, the wafer 39 can be inserted into or removed from the rotatable support 33. The inner diameter between the holding arms must be greater than the diameter of the wafer 39 to allow the wafer 39 to be placed into the chamber and onto the rotatable support 33. Furthermore, if notch alignment is required, then the position of the wafer 39 in the rotatable support 33 needs to be rotationally aligned before wafer loading or unloading can occur. This is achieved by a central lift pillar 40 which lifts the wafer 39 from the rotatable support 33 and enables the alignment of a notch or flat on the wafer 39 to a defined orientation on the rotatable support prior to the unloading step.

The particular version of the chamber in FIG. 4 has a maximum height when opened of around 215 mm; this allows the chambers to be stacked with a pitch of around 225 mm, leading to an efficient use of space.

Figure 5B:
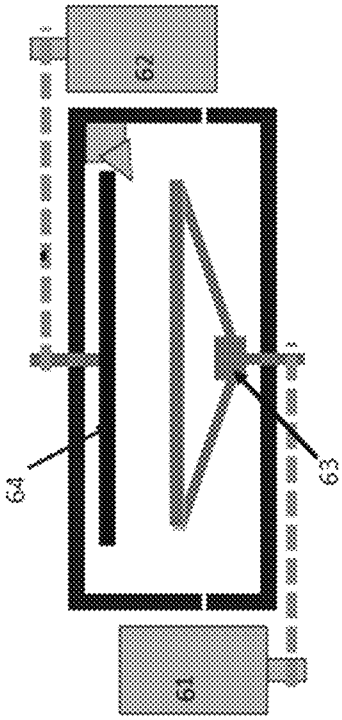
FIGS. 5*a* and 5*b* are schematic cross-sectional views similar to FIG. 3, showing alternative drive means.
Figure 5A:
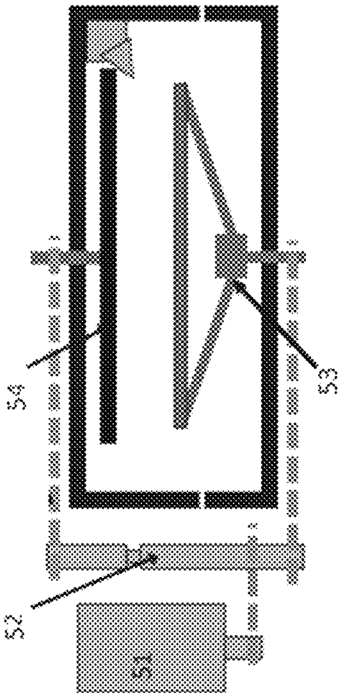

The invention is not limited to the specific drive arrangement shown in FIG. 3. FIG. 5*a* shows a variant in which the rotatable support 53 and the rotatable member 54 are separate bodies arranged to rotate about a common axis. The rotatable support 53 for the wafer supports the wafer from below, which may simplify the procedure of loading and unloading the wafer. The rotatable support 53 and rotatable member 54 are driven by a single motor 51, and are connected thereto via a telescopic shaft coupling 52 (the telescopic aspect is necessary to allow the upper and lower parts of the chamber to move away from each other to open the chamber). FIG. 5*b* shows an alternative version in which separate motors 61, 62 are provided for the rotatable support 63 and the rotatable member 64, which again are arranged to rotate about a common axis. As with the embodiment shown in FIG. 3, the motor or motors 61, 62 are arranged to the side of the chamber, to keep the overall height as low as possible.

By forming the rotatable support and the rotatable member as two distinct entities, it is possible to reduce the overall size of the rotor assembly, which in turn can result in a chamber with a smaller diameter. The arrangements shown in FIGS. 5*a* and 5*b* can also allow more process flexibility for cleaning and drying the wafer, as they both allow the rotatable support and the rotatable member to be rotated at different speeds. Further, the arrangement shown in FIG. 5*b* allows the rotatable support and the rotatable member to be spun independently of each other.

When operating with two drive assemblies, the rotatable member will typically have a maximum speed less than that of the wafer (less than or equal to around 1000 rpm), as it contains no surface morphology which needs to be dried, and only requires the removal of larger droplets of liquid. If the process uses a deionized water clean, then the rotatable member can be made from a hydrophobic plastic material, such as polycarbonate, although the choice of material will of course be dependent on compatibility with the process chemistry.

The rotatable member will typically be machined or moulded as a single part, to ensure mechanical robustness. Further, the rotatable member may be formed with ribs or similar reinforcing features radiating out from the centre to increase its rigidity.

FIGS. 3, 5*a* and 5*b* only show a limited number of wetting nozzles. In reality, a spin rinse dryer will feature several wetting nozzles able to access both the upper and lower surfaces (front and back) of the wafer. Different flow rates, drive pressures and spray shapes of the nozzles can be used, depending on the process requirements. Common options for spray shape are fans and solid cones. Typical nozzle flow rates are 1 litre per minute at 35 psi (around 240 kPa), and so a spin rinse dryer using four fluid nozzles would run at 4 litres per minute.

The chamber may be sealed during water delivery, which can allow wafers to be processed at pressures below atmospheric, typically 10 to 100 Torr (around 133 to 1330 Pa).

Although only specific embodiments of the invention have been described, the skilled person will appreciate that the invention is not limited to these embodiments, and that variations can be made within the scope of the appended claims.

The invention claimed is:

1. A spin rinse dryer for treating a substrate, including:

an enclosure formed by a main body and a lid;

a rotatable support located within the enclosure for supporting the substrate;

a rotatable member located within the enclosure above the rotatable support, the rotatable member having a continuous lower surface and a top, wherein the top of the rotatable member is positioned within 3 mm to a lower surface of the lid, wherein the enclosure and the rotatable member are both circular in plan view, and wherein a circular edge of the rotatable member extends to within 10 mm or less of the main body;

a drive for rotating the rotatable member;

a liquid cleaning fluid source that includes a liquid cleaning fluid; and at least one nozzle in fluid communication with the liquid cleaning fluid source, wherein the at least one nozzle is configured to direct the liquid cleaning fluid toward the substrate located on the rotatable support, wherein the spin rinse dryer is capable of operating at pressures below atmospheric pressure.

2. The spin rinse dryer as claimed in claim 1, wherein the lower surface of the rotatable member is arranged to be substantially parallel to an upper surface of a substrate when the substrate is supported by the rotatable support.

3. The spin rinse dryer as claimed in claim 1, wherein the rotatable support is connected to the rotatable member such that the rotatable support and the rotatable member rotate together.

4. The spin rinse dryer as claimed in claim 3, wherein a number of arms extend downwards from the rotatable member, and a prong extends radially inwardly from the lower end of each arm, the prongs acting as the rotatable support.

5. The spin rinse dryer as claimed in claim 4, wherein there are three of the arms that are circumferentially equispaced.

6. The spin rinse dryer as claimed in claim 3, wherein the drive is located alongside the enclosure, and is connected to the rotatable member and the rotatable support so as to drive the rotatable member and the rotatable support to rotate.

7. The spin rinse dryer as claimed in claim 1, wherein the rotatable support and the rotatable member are not connected to each other, and rotate separately.

8. The spin rinse dryer as claimed in claim 7, wherein the rotatable support and the rotatable member are arranged to rotate about a common axis.

9. The spin rinse dryer as claimed in claim 7, wherein a single of the drive is located alongside the enclosure, and is connected to both the rotatable member and the rotatable support so as to drive the rotatable member and the rotatable support to rotate.

10. The spin rinse dryer as claimed in claim 9, wherein the drive is connected to the rotatable member and the rotatable support via a telescopic shaft.

11. The spin rinse dryer as claimed in claim 7, wherein two of the drives are located alongside the enclosure, a first of the drives being connected to the rotatable member so as to drive the rotatable member to rotate, and a second of the drives being connected to the rotatable support so as to drive the rotatable support to rotate.

12. The spin rinse dryer as claimed in claim 1, wherein a diameter of the rotatable member is less than an internal diameter of the enclosure.

13. The spin rinse dryer as claimed in claim 1, wherein a diameter of the rotatable member is greater than a diameter of the substrate to be treated.

14. The spin rinse dryer as claimed in claim 1, wherein the rotatable member is formed from a hydrophobic material.

15. The spin rinse dryer as claimed in claim 1, wherein the rotatable member is formed as a single part.

16. The spin rinse dryer as claimed in claim 1, wherein the rotatable member is formed with reinforcing features.

17. The spin rinse dryer as claimed in claim 1, wherein the at least one nozzle is located above and below the rotatable support.

18. The spin rinse dryer as claimed in claim 1, wherein a vertical height of the spin rinse dryer is less than around 300 mm.

19. The spin rinse dryer as claimed in claim 1, wherein the enclosure encloses the rotatable support and the rotatable member.

20. An apparatus for processing a substrate comprising a stack of substrate processing modules in which at least one of the modules is a spin rinse dryer as claimed in claim 1.

* * * * *